US006204482B1

(12) United States Patent
Smith et al.

(10) Patent No.: US 6,204,482 B1
(45) Date of Patent: Mar. 20, 2001

(54) METHOD AND APPARATUS FOR COOLING THE EXTERIOR OF A TOASTER OVEN

(75) Inventors: Mark J. Smith, Ovilla; Eric Thoreson, Arlington, both of TX (US)

(73) Assignee: American Permanent Ware Company, Dallas, TX (US)

( * ) Notice: Subject to any disclaimer, the term of this patent is extended or adjusted under 35 U.S.C. 154(b) by 0 days.

(21) Appl. No.: 09/317,095

(22) Filed: May 22, 1999

(51) Int. Cl.⁷ .................................................... F27B 9/06
(52) U.S. Cl. ............................ 219/388; 219/391; 99/386
(58) Field of Search ................................... 219/388, 391, 219/399, 400; 99/386, 443 C

(56) References Cited

U.S. PATENT DOCUMENTS 4,465,701 * 8/1984 Holman et al. ..................... 426/523
4,488,480 * 12/1984 Miller et al. ........................ 99/386
5,473,975 * 12/1995 Bruno et al. ........................ 99/335

* cited by examiner

Primary Examiner—Teresa Walberg
Assistant Examiner—Shawntina Fuqua
(74) Attorney, Agent, or Firm—Gardere Wynne Sewell LLP; Sanford E. Warren, Jr.; Daniel J. Chalker

(57) ABSTRACT

The present invention provides a method and apparatus for cooling the exterior of a toaster oven. The toaster oven has a cooking chamber and a product slide within an exterior casing. Outside air is forced into a channel formed between (1) the product slide and the exterior casing and (2) the cooking chamber and a corresponding portion of the exterior casing. The forced air is then directed out of the channel into a food pre-heating area outside the cooking chamber.

16 Claims, 3 Drawing Sheets

METHOD AND APPARATUS FOR COOLING THE EXTERIOR OF A TOASTER OVEN

FIELD OF THE INVENTION

The present invention relates generally to toaster ovens and more particularly to a method and apparatus for cooling the exterior of a toaster oven.

BACKGROUND OF THE INVENTION

Without limiting the scope of the present invention, this background of the present invention is described in connection with toaster ovens. Accordingly, the present invention is applicable to cooling the exterior of any cooking apparatus.

Commercial cooking equipment is typically designed to cook food quickly and efficiently. As a result, the heat generated by commercial cooking equipment causes the exterior casing of the equipment to become very hot. This poses a hazard to both employees and adjacent equipment. In addition, the heat radiated from the exterior casing of the equipment raises the ambient temperature of the kitchen and thus increases energy costs through wasted heat and increased air conditioning.

Often, the cooking equipment has one or more fans that direct cool outside air against selected electrical parts to avoid overheating. The heated air is then directed out of the cooking equipment through vents. In forced convection ovens, however, the heated air is directed into the cooking chamber to assist in the cooking process. These fans typically direct the air into the cooking chamber or out of the cooking equipment through vents. Some fans are positioned such that outside air is pulled over cooked food, which causes the premature cooling of the cooked food and introduces air into the cooking equipment that contains residual heat and other contaminants from the cooked food.

SUMMARY OF THE INVENTION

The present invention provides a method and apparatus for cooling the exterior of a toaster oven. The toaster oven has a cooking chamber and a product slide within an exterior casing. Outside air is forced into a channel formed between (1) the product slide and the exterior casing and (2) the cooking chamber and a corresponding portion of the exterior casing. The forced air is then directed out of the channel into a food preheating area outside the cooking chamber.

Other features and advantages of the present invention shall be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION

While the making and using of various embodiments of the present invention are discussed in detail below, it should be appreciated that the present invention provides many applicable inventive concepts which can b e embodied in a wide variety of specific contexts. The specific embodiment s discussed herein are merely illustrative of specific ways to make and use the invention and do not delimit the scope of the invention.

Figure 1:
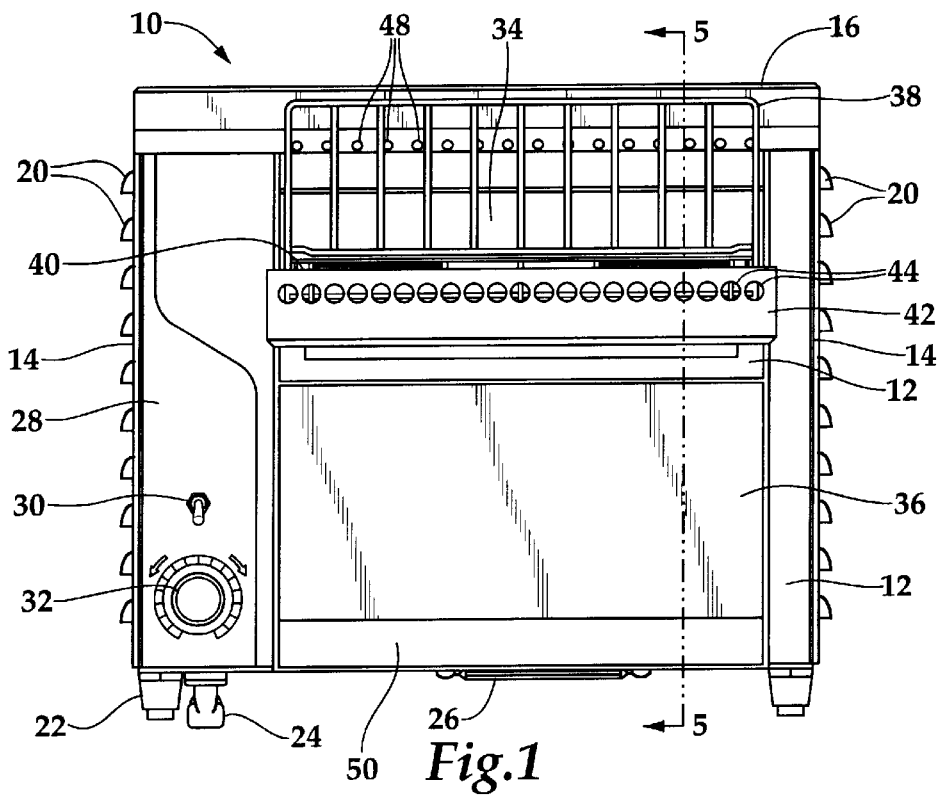
FIG. 1 is a front view of a toaster oven in accordance with the present invention.
Figure 2:
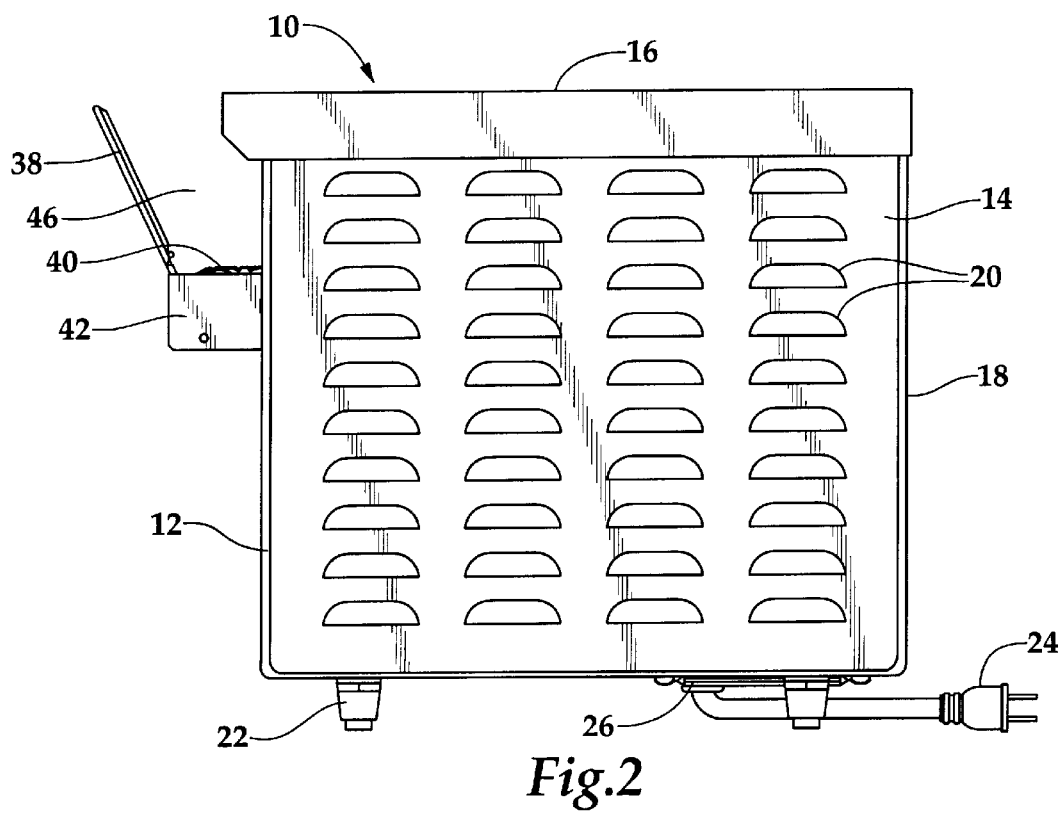
FIG. 2 is a side view of a toaster oven in accordance with the present invention.

Referring now to FIGS. 1 and 2, the toaster oven 10 of the present invention is illustrated. The toaster oven 10 has a main body 12 with an external casing comprising side covers 14, top cover 16 and back cover 18. The side covers 14 have a number of vents 20 that provide additional cooling to the external casing.

The toaster oven 10 is supported by legs 22, which should be large enough to create sufficient air flow under the toaster oven 10 and allow room for electrical cord 24. One inch high legs 22 are adequate. A fan guard 26 is also visible on the bottom of the toaster oven 10.

A control panel 28 having an ON/OFF switch 30 and conveyor speed control 32 are positioned to one side of the cooking chamber 34 and product slide 36. The ON/OFF switch 30 is typically a rocker switch. The conveyor speed control 32 is typically a rheostat. Positioning the control panel 28 and associated electrical circuitry to the one side of the cooking chamber 34 and product slide 36 minimizes damage to these components caused by heat and contaminants from the cooking chamber 34 and product slide 36.

A feeder 38 is used to load food onto a conveyor belt 40, which is preferably formed by a number of wires linked together to form a continuous belt so that crumbs fall through the conveyor belt 40 onto the reflector tray 42. The reflector tray 42 has a number of openings 44 for improved heat distribution and can be removed for easy cleaning. The feeder 38 and the portion of the conveyor belt 40 that extends beyond the front of the toaster oven 10 form a food pre-heating area 46. A number of apertures 48 direct heated air into the food pre-heating area 46. Once the food has been toasted, a toast drawer 50 can be pulled out to hold additional toasted food.

Figure 3:
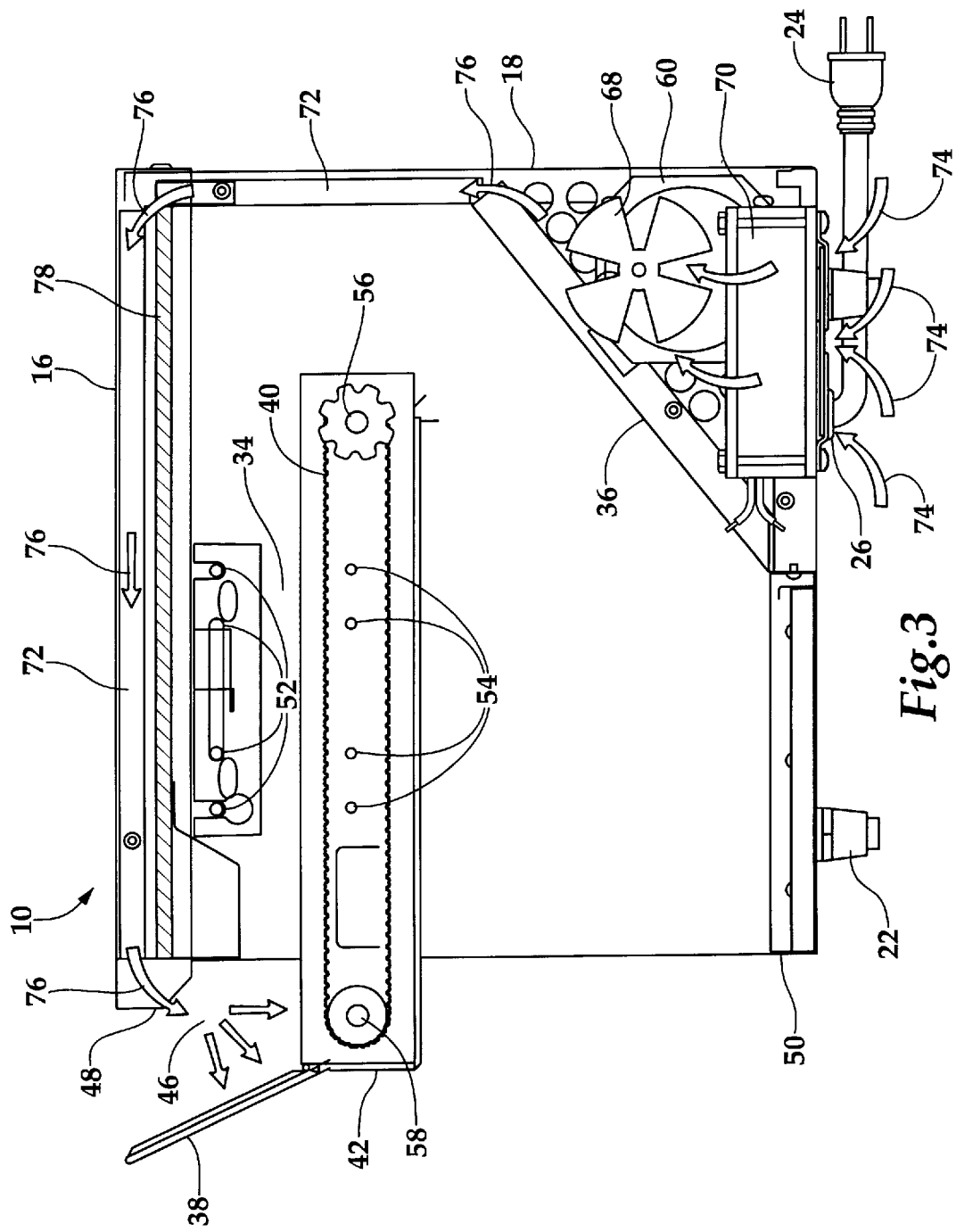
FIG. 3 is a cross-sectional view taken through line 5—5 of FIG. 1.

Now referring to FIG. 3, a cross-sectional view taken through line 5—5 of FIG. 1 is shown. The toaster oven 10 is equipped with a top heating element 52 and a bottom heating element 54 that mounted within the cooking chamber 34. The cooking chamber 34 is the area inside the toaster oven 10 between the conveyor belt 40 and the top of the main body 12. As illustrated, top and bottom heating elements 52 and 54 are sinusoidally configured continuous elements. Other element configurations, however, are possible. Preferably, top and bottom heating element 52 and 54 are approximately 900 watt radiant heating elements, but may be anywhere in a range of 800 to 1300 watts. The reflector plate 42 is positioned below the bottom heating elements 54 to reflect heat back into the cooking chamber 34.

Figure 4:
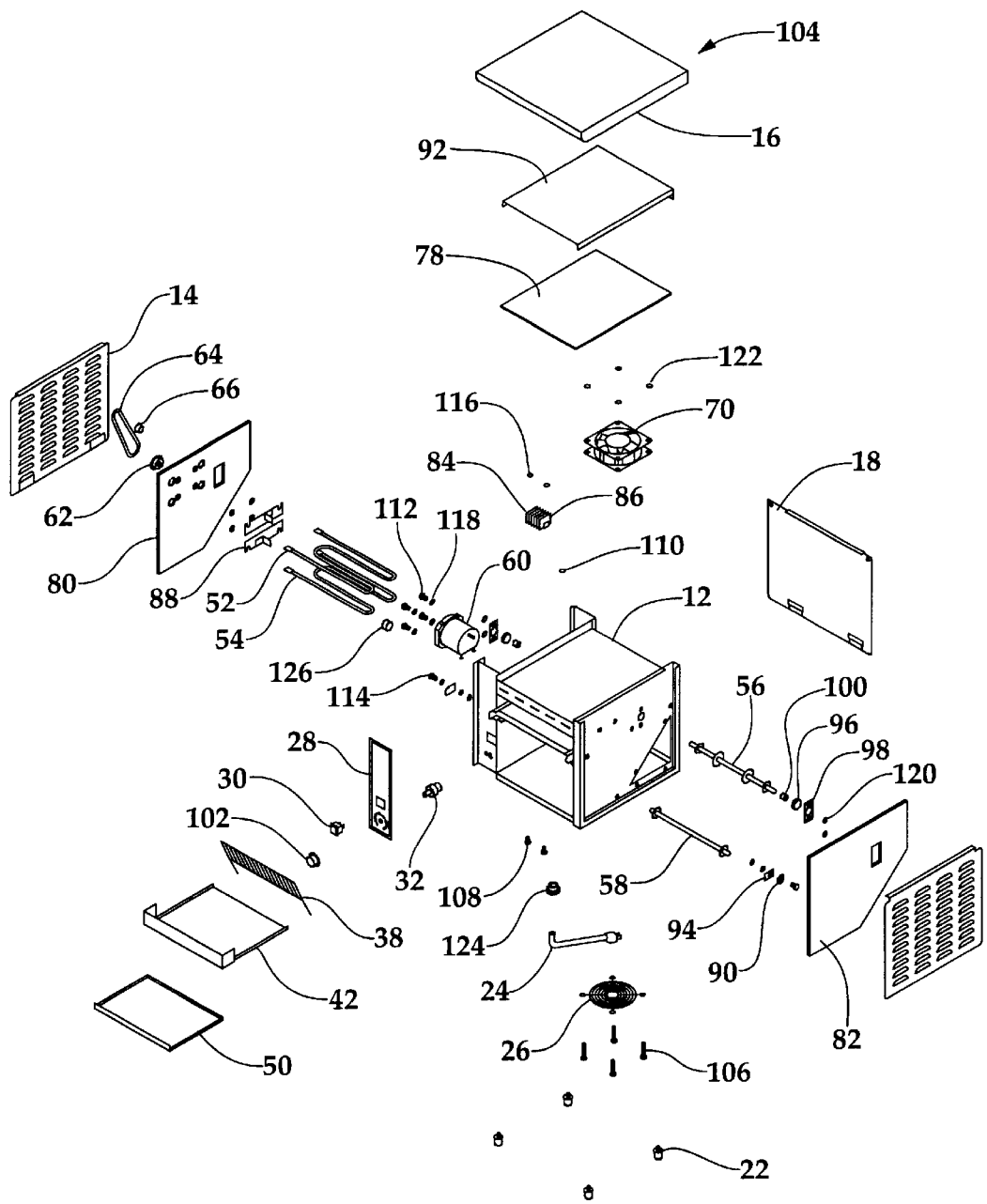
FIG. 4 is an exploded view of a toaster oven in accordance with the present invention.

The conveyor belt 40 is positioned in the unit on a drive shaft 56 and idler shaft 58. A drive motor 60 is connected to drive shaft 56 through motor sprocket 62 (FIG. 4), drive chain 64 (FIG. 4), and conveyor sprocket 66 (FIG. 4). The drive motor 60 may have its own fan 68 to provide additional cooling. Drive motor 60 is controlled with a speed controller 32 for adjusting and controlling the speed of the conveyor belt 40.

Food products to be toasted are placed on the feeder 38 and slide down onto the conveyor belt 40. The conveyer belt 40 carries food products from the pre-heating area 46 through the cooking chamber 34, where the food products are toasted between the top and bottom heating elements 52 and 54, and to the back of the toaster oven 10. The food products then drop from the conveyor belt 40 onto a inclined product slide 36 and slide to the front of the toaster oven 10.

The cooling fan 70 forces outside air 74 into channel 72 formed between (1) the product slide 36 and the back cover 18 of the exterior casing, and (2) the top of the cooking chamber 34 and a corresponding portion of the exterior casing (the top cover 16). As the forced air 76 passes through the channel 72, it absorbs heat radiated from the cooking chamber 34. The forced air 76 is then directed out of the channel 72 into a food pre-heating area 46 outside the cooking chamber 34 through one or more apertures 48. Some of the air from the cooling fan 70 flows into the space between the side covers 14 and the main body 12 to provide additional cooling of the external casing. The vents 20 in the side covers 14 also provide cooling of the external casing.

Directing the forced air 76 into the food pre-heating area 46 pre-heats and drys the food product, and reduces heat loss from the cooking area 34. Top, left and right side insulation 78, 80 (FIG. 4) and 82 (FIG. 4) further reduces heat loss from the cooking chamber 34 and helps to lower the temperature of the exterior of the toaster oven 10. The insulation 78, 80 and 82 is preferably ceramic, but may also be fiberglass. The cumulative effects of the channel 72 and insulation 78, 80 and 82 allow faster heating of the cooking chamber 34 and more uniform temperatures in the cooking chamber 34.

Now referring to FIG. 4, an exploded view of a toaster oven in accordance with the present invention is shown. Many of the components illustrated have already been described. The function and connection of those components not specifically described above are obvious to one skilled in the art. The following table lists the parts identified in FIG. 4.

Parts List

| Item | Part No. | Description | Quantity |
| --- | --- | --- | --- |
| 84 | 34236 | Terminal Block End Mounting | 1 |
| 86 | 34237 | Terminal Block (6) .250 Male | 4 |
| 12 | 38101 | Main Body | 1 |
| 88 | 38114 | Heating Element Support | 2 |
| 14 | 38117 | Side Cover | 2 |
| 18 | 38119 | Back Cover | 1 |
| 58 | 38122 | Idler Shaft | 1 |
| 90 | 38125 | Bearing Flanged Polymer | 2 |
| 92 | 38126 | Top Inner | 1 |
| 16 | 38127 | Top Cover | 1 |
| 42 | 38128 | Reflector Tray | 1 |
| 50 | 38129 | Toast Drawer | 1 |
| 94 | 38130 | Clip Bearing | 2 |
| 38 | 38131 | Feeder | 1 |
| 80 | 38140 | Insulation Left Side | 1 |
| 82 | 38141 | Insulation Right Side | 1 |
| 78 | 38142 | Insulation Top | 1 |
| 52, 54 | 54087 | Heating Element | 2 |
| 28 | 58167 | Control Panel Label | 1 |
| 30 | 67006 | Switch, Rocker, DPDT, 20A-125V, 16A-250V | 1 |
| 64 | 8290? | 1/4" Drive Chain | 1 |
| 96 | 83248 | Shaft Bearing | 2 |
| 32 | 83255 | Rheostat 120V | 1 |
| 62 | 83260 | Sprocket, 18 tooth 1/4 pitch 5/16 bore | 1 |
| 66 | 83261 | Sprocket, 12 tooth 1/4 pitch 3/8 bore | 1 |
| 24 | 83266 | Cord Assembly 120V 14/3 5-15P | 1 |
| 22 | 83267 | Leg 1" Plastic with Chrome | 4 |
| 98 | 83821 | Bearing Bracket | 2 |
| 100 | 83868 | Conveyor Shaft Spacer | 2 |
| 56 | 83956 | Drive Shaft Assembly | 1 |

-continued

Parts List

| Item | Part No. | Description | Quantity |
| --- | --- | --- | --- |
| 60 | 85152 | AT10 Segmented Belt Motor AT10 115V 60Hz 3RPM MK 5-3902 | 1 |
| 70 | 85286 | Fan Motor Cooling 120V 4.5" | 1 |
| 26 | 85287 | Fan Guard | 1 |
| 102 | 88705 | Knob 039-266 8A Black | 1 |
| 104 | 88889 | Screw #8 × 1/2 AB SMS PHL TRUSS LGM MI PLT | 2 |
| 106 | 88923 | Screw, 8-32 × 3/4 SLT PAM MS SS | 4 |
| 108 | 88948 | Screw 6-32 × 3/4 PAN HD | 2 |
| 110 | 88961 | Nut Hex 10-24 | 1 |
| 112 | 89006 | Screw, 10-24 × 5/8 PAN HD SLOT | 4 |
| 114 | 89039 | Screw, 8-32 × 5/16 PH SL SS | 2 |
| 116 | 89054 | Nut, KEPS 6-32 | 2 |
| 118 | 89059 | Washer #10 External Lock | 6 |
| 120 | 89061 | Nut, Hex 10-24 | 8 |
| 122 | 89063 | Nut, Hex 8-32 | 6 |
| 124 | 89111 | Bushing, Strain Relief SR-7W-2 | 1 |
| 126 | 89184 | Bushing, .875 HEYCO 2126 | 1 |

Although preferred embodiments of the invention have been described in detail, it will be understood by those skilled in the art that various modifications can be made therein without departing from the spirit and scope of the invention as set forth in the appended claims.

What is claimed is:

1. A method of cooling an exterior casing of a toaster oven, the toaster oven having a cooking chamber and a product slide within the exterior casing, the method comprising the steps of:

forcing outside air into a channel comprising a rear channel formed between the rear of the product slide and the rear of the exterior casing, and a top channel formed between the top of the cooking chamber and a corresponding portion of the exterior casing;

directing the forced air our of the channel into a food pre-heating area outside the cooking chamber;

forcing outside air into a side chamber on each side of the toaster oven formed between a side of the product slide, a side of the cooking chamber and the exterior casing; and directing the forced air out of each side chamber though one or more vents in the exterior caking of each side chamber.

2. The cooling method as recited in claim 1, wherein a fan forces the outside air into the rear channel.

3. The cooling method as recited in claim 1, wherein one or more apertures located at an end of the top channel direct the forced air into the food pre-heating area.

4. The cooling method as recited in claim 1, wherein a first insulating barrier is attached to an interior portion of the top channel.

5. The cooling method as recited in claim 4, wherein the first insulating barrier is ceramic.

6. The cooling method as recited in claim 4, wherein a second insulating barrier is attached to an interior portion of each side chamber.

7. The cooling method as recited in claim 6, wherein the second insulating barrier is ceramic.

8. A toaster oven comprising;

an exterior casing;

a cooking chamber within the exterior casing;

a product slide within the exterior casing;

a channel comprising a rear channel formed between the rear of the product slide and the rear of the exterior casing, and a top channel formed between the top of the cooking chamber and a corresponding portion of the exterior casing;

a side chamber on each side of the toaster oven formed between a side of the product slide, a side of the cooking chamber and the exterior casing;

one or more vents in the exterior casing of each side chamber so that the forced air is directed out of the side chamber, means for forcing outside air into the rear channel and into each side chamber and out of the one or more vents; and means for directing the forced air out of the top channel into a food pre-heating area outside the cooking chamber.

9. The toaster oven as recited in claim 8, wherein the means for forcing outside air into the rear channel is a fan.

10. The toaster oven as recited in claim 8, wherein the means for directing the forced air out of the top channel into a food pre-heating area outside the cooking chamber comprises one or more apertures located at an end of the top channel.

11. The toaster oven as recited in claim 8, further comprising a first insulating barrier attached to an interior portion of the top channel.

12. The toaster oven as recited in claim 11, wherein the first insulating barrier is ceramic.

13. The toaster oven as recited in claim 11, further comprising a second insulating barrier attached to an interior portion of each side chamber.

14. The toaster oven as recited in claim 13, wherein the second insulating barrier is ceramic.

15. A toaster oven comprising:

an exterior casing;

a cooking chamber within the exterior casing;

a product slide within the exterior casing;

a channel comprising a rear channel formed between the rear of the product slide and the rear of the exterior casing, and a top channel formed between the top of the cooking chamber and a corresponding portion of the exterior casing;

a first insulating barrier attached to an interior portion of the W channel;

a side chamber on each side of the toaster oven formed between a side of the product slide, a side of the cooking chamber and the exterior casing;

a second insulating barrier attached to an interior portion of each side chamber;

a fan for forcing outside air into the rear channel and each side chamber;

one or more apertures for directing the forced air out of the top channel into a food pre-heating area outside the cooking chamber; and one or more vents in the exterior casing of each side chamber so that the forced air is directed out of each side chamber.

16. The toaster oven as recited in claim 15, wherein the first and second insulating barriers are ceramic.

* * * * *